United States Patent [19]
Endsley et al.

[11] Patent Number: 5,957,630
[45] Date of Patent: Sep. 28, 1999

[54] BORING TOOL ASSEMBLY

[75] Inventors: John C. Endsley, Washington; Michael H. Hinrichsen, Goodfield, both of Ill.

[73] Assignee: Caterpillar Inc., Peoria, Ill.

[21] Appl. No.: 08/968,247

[22] Filed: Nov. 12, 1997

[51] Int. Cl.[6] .............................. B23B 3/04; B23B 29/03
[52] U.S. Cl. ................................. 408/83; 83/705; 83/57
[58] Field of Search ........................... 408/83, 705, 714, 408/57

[56] References Cited

U.S. PATENT DOCUMENTS

| | | |
|---|---|---|
| 2,210,128 | 8/1940 | Rohr . |
| 2,334,795 | 11/1943 | Smith ........................................ 408/83 |
| 2,466,745 | 4/1949 | Seamans . |
| 2,679,772 | 6/1954 | Blazek . |
| 3,287,998 | 11/1966 | Goernert et al. . |
| 3,361,014 | 1/1968 | McClennan . |
| 3,762,828 | 10/1973 | Heinrich ................................. 408/705 |
| 4,096,771 | 6/1978 | Monro ....................................... 408/83 |
| 4,240,770 | 12/1980 | Berstein .................................... 408/83 |
| 4,666,350 | 5/1987 | Nicholas .................................... 408/83 |
| 4,978,258 | 12/1990 | Lins ......................................... 408/187 |
| 5,567,093 | 10/1996 | Richmond ................................ 408/57 |
| 5,795,111 | 8/1998 | Kress et al. ............................... 408/83 |

FOREIGN PATENT DOCUMENTS

| | | | |
|---|---|---|---|
| 143046 | 7/1980 | Germany ................................. 408/83 |
| 309780 | 7/1971 | Russian Federation . |
| 197710 | 10/1977 | U.S.S.R. . |
| 1225704 | 4/1986 | U.S.S.R. . |
| 0526125A1 | 2/1993 | WIPO . |

OTHER PUBLICATIONS

Dihart CNC–Tool Holder for Rapid Set System with hardened guide Series 541.35. 0,4961–1,9685.

*Primary Examiner*—Daniel W. Howell
*Assistant Examiner*—Rouzbeh Tabaddor
*Attorney, Agent, or Firm*—J. W. Burrows

[57] ABSTRACT

A boring tool assembly is provided and has a cutting tool mounted on one end thereof and permits the boring of a straight hole through a member. The boring tool assembly includes a boring bar having integral guide members disposed thereon that follows behind the cutting tool and maintains contact with the machined surface just cut in order to keep the cutting tool in proper alignment. To permit the continued use of the boring bar after the outer diameter of the cutting tool has been reduced due to wear, each of the integral guide members are resiliently mounted on the boring bar. This permits the guide members to collapses inwardly to maintain a perfect fit with the pilot pore. This collapse inwardly of the guide members is important to maintain bearing contact of the guide members with the pilot bore if the hole being cut by the cutting tool reduces in size due to wear or if the cutting tool has been re-sharpened or replaced with a different cutting tool. A resilient member is bonded in respective slots between the bottom of the associated slot and the guide member to provide the resilient mounting of the hardened guide members to the boring bar.

5 Claims, 2 Drawing Sheets

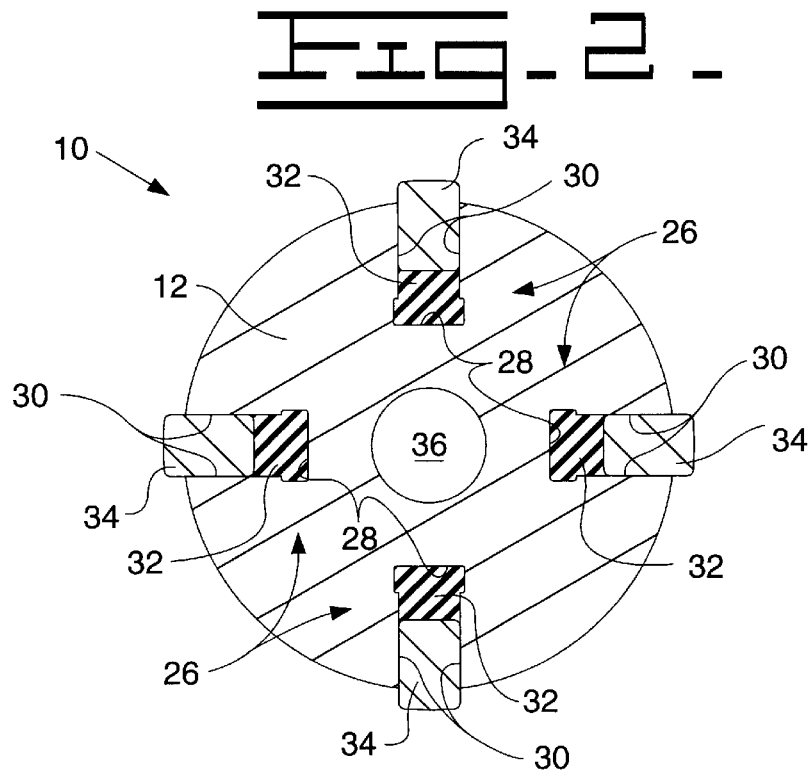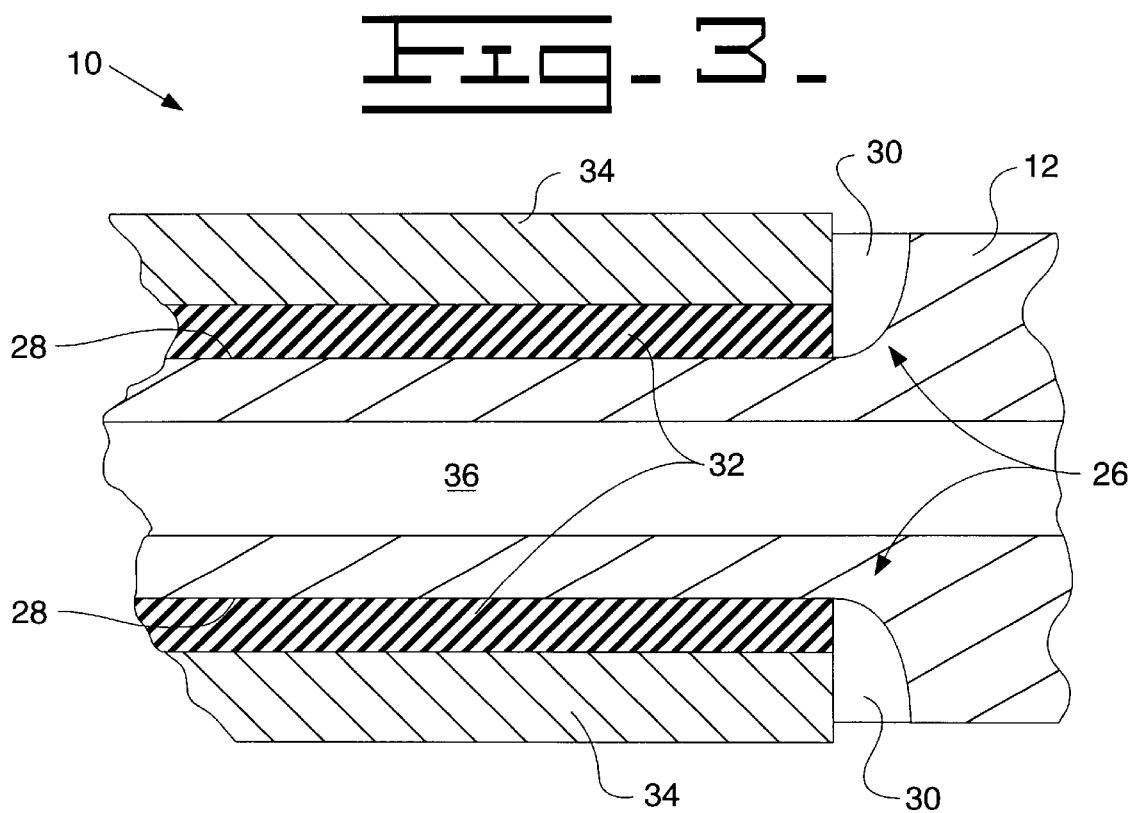

BORING TOOL ASSEMBLY

TECHNICAL FIELD

The subject invention relates generally to a boring tool that is typically used to bore deep holes and more particularly to a boring tool assembly that has guides to aid in assuring that the boring tool continues to bore in a straight line even when the outer diameter of the cutting tool reduces in size due to wear or re-sharpening.

BACKGROUND ART

Boring tools are well known in the art. Many of these known boring tools have a cutting tool disposed on one end thereof for boring a hole in a material, such as steel, aluminum or cast iron. In long bored holes, the boring tool has a tendency to "wander" as opposed to cutting in a straight line. This may be attributed to the material being cut varying in toughness or hardness causing the boring tool to take the path of least resistance. Many time the hole to be bored has been partially defined by the casting or forging process to form a cored hole. These cored holes are not always disposed in the proper location or there are interrupted surfaces that the cutting tool must cut. In these situations, the cutting tool may "wander" and not cut in a straight line, especially if the boring bar is long. In order to offset this "wandering" of the cutting tool, it is known to provide a pilot stem on the forward end of the boring tool that is positioned in a pilot hole. With the pilot stem in the pilot hole, the cutting tool is maintained in its proper location. Additionally, it is known to provide separate bearing assemblies that are mounted on the boring tool behind the cutting tool. This also works to keep the cutting tool aligned properly. These bearing assemblies are normally more bulky in size and also are separate elements that must be mounted on the boring tool. It is also known to provide individual guides within the bearing assembly that can be replaced. Additionally, springs or other resilient members may be placed behind the individual guides of the bearing assembly in order to allow the bearing member to fit into holes of varying sizes and/or to compensate for wear of the cutting tool. Since these known bearing members are narrow, they are not practical when boring holes that are interrupted by cavities, such as is present when boring cored holes in a valve body for a valve spool. It is also known to use a boring tool mounted on a boring bar with rigidly attached guides to enlarge previously machined holes.

The present invention is directed to overcoming one or more of the problems as set forth above.

DISCLOSURE OF THE INVENTION

In one aspect of the present invention, a boring tool assembly is provided and adapted to have a cutting tool disposed on one end thereof to cut or bore a hole of a predetermined size in a member. The boring tool assembly includes a longitudinal extending boring bar having a plurality of slots defined therein about its circumference along its longitudinal length. Each slot of the plurality of the slots has a bottom surface and opposed side walls. A hardened guide member is disposed in each of the respective slots of the plurality of slots and a resilient member is disposed in each of the respective slots between the hardened guide member and the bottom of the associated slot. Each of the respective resilient member is connected to the bottom surface of the associated slot and to the associated hardened guide member.

BRIEF DESCRIPTION OF THE DRAWINGS

FIG. 2 is a cross-sectional view taken along the line 2—2 of FIG. 1; and

FIG. 3 is a partial section taken along line 3—3 of FIG. 1.

BEST MODE FOR CARRYING OUT THE INVENTION

Figure 1:
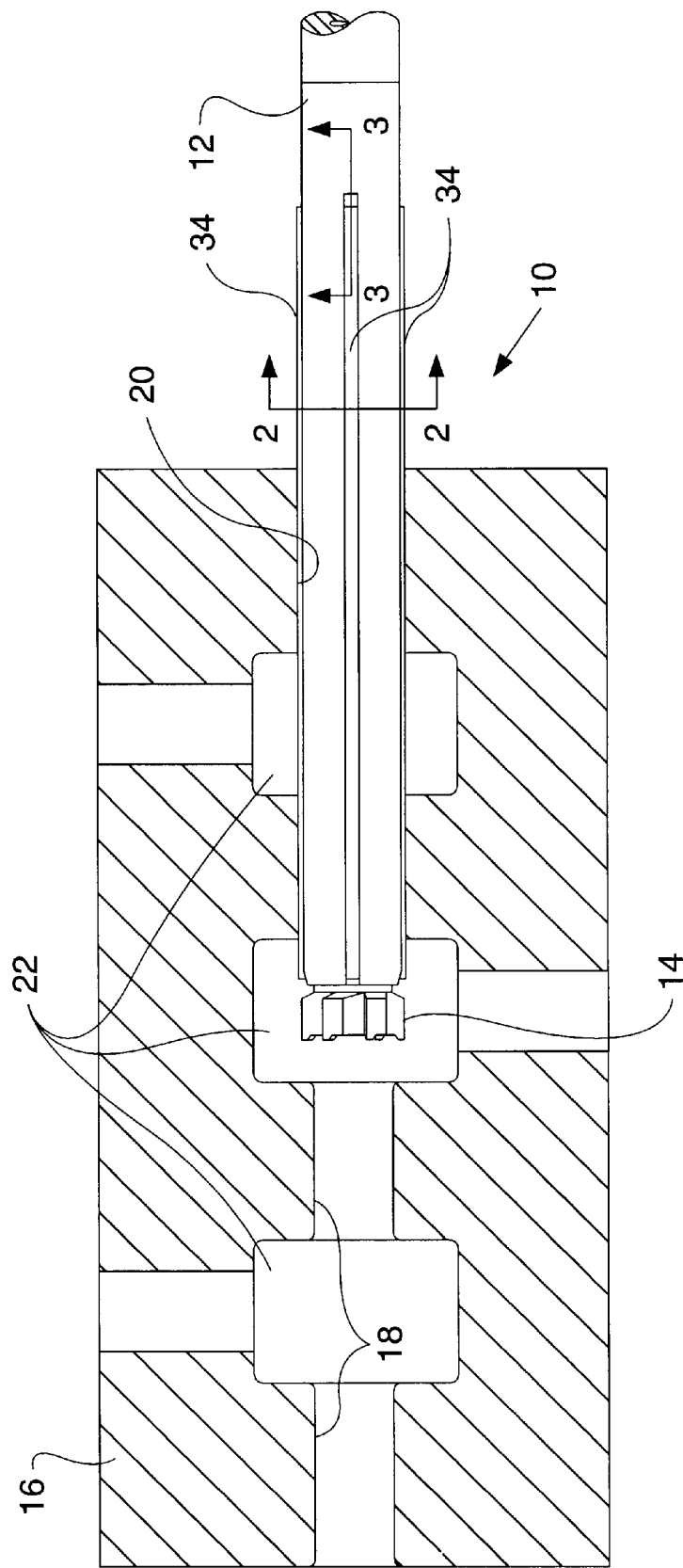
FIG. 1 is a diagrammatic representation of an embodiment incorporating the subject invention.

Referring to the drawings, a boring tool assembly 10 is illustrated and includes a longitudinally extending boring bar 12 and a cutting tool 14 attached to one end thereof. The boring tool assembly 10 is illustrated in its operative position boring a hole in a member 16, such as a valve body. The valve body 16 defines a cored passage 18 therein having material that is machined away by the cutting tool 14 to define a machined bore 20. As is typical with valve bodies, annular cavities 22 are defined therein spaced from one another along the longitudinal axis of the cored passage 18. Each of the annular cavities 22 is larger than the cored passage 18. Consequently, as the cutting tool 14 is machining the cored passage 18, the cutting tool 14 enters and exits the respective annular openings 22. It is well known that the longitudinal length of the annular cavities in different valve bodies varies with different valve designs. Therefore, many times the outer diameter of the cutting tool 14 is totally out of contact with the machined bore 20.

A plurality of slots 26 is defined in the boring bar 12 spaced from one another around the circumference and extending along the longitudinal length of the boring bar. For simplicity of illustration, only four slots are illustrated even though at least six slots are normally used. It is recognized that the number of slots 26 in the boring bar 12 could be changed without departing from the essence of the subject invention.

Each of the slots 26 has a bottom surface 28 and opposed side walls 30. The longitudinal length of each slot is longer than the diameter of the boring bar 12 and each slot 26 originates at a location generally adjacent the cutting tool 14. Preferably, each of the slots 26 is several times longer than the diameter of the boring bar 12. The required length of the respective slots generally depends on the length of the hole to bore and/or the length of the interrupted surfaces to be machined.

A resilient member 32 is disposed in respective ones of the slots 26 and secured thereto. In the subject embodiment, the resilient members 32 are bonded to the bottom surface 28 of the respective slots 26 and contained between the opposed side walls 30. The resilient members 32 can be made of various types of materials, such as, for example, rubber or polyurethane. Preferably, if rubber is used, the durometer thereof should be 50d or higher to ensure the proper stiffness.

A hardened guide member 34 is disposed in respective ones of the slots 26 and secured to the associated resilient member 32. In the subject embodiment, the respective hardened guide members 34 are bonded to the associated resilient member 32. Each of the hardened guide members 34 extends outwardly from the associated slot 26 and has an arcuate surface that substantially matches the surface of the machined bore 20. Even though the respective hardened guide members 34 are illustrated as being one piece, it is recognized that each could be composed of several segments.

A passage 36 is defined within the boring bar 12 along its longitudinal length. The passage 36 permits coolant flow to be directed through the boring bar 12 to a location adjacent the cutting tool 14. Additional relief grooves (not shown)

could be defined along the longitudinal length of the boring bar 12 between the respective slots 26 in order to permit an escape route for the cut material and the cooling flow.

Industrial Applicability

During use of the boring tool assembly 10 illustrated in the drawings, the cutting tool 14 begins to machine the cored passage 18 of the member 16 to generated the machined bore 20. As is well known, when boring a cored passage or boring a long hole, the cutting tool 14 has a tendency to wander or follow the path of least resistance and not bore a straight hole.

As the cutting tool 14 travels further into the member 16, the hardened guide members 34 enter the machined bore 20. Prior to the hardened guide members 34 entering the machined bore 20, the diameter defined by the hardened guide members 34 is greater than the diameter of the machined bore 20. Consequently, the hardened guide members 34 are forced inwardly against the bias of the resilient members 32. The biasing forces created by the resilient members 32 maintain the boring bar 12 in concentric alignment with the machined bore 20. By maintaining the boring bar 12 concentric with the machined bore 20, the cutting tool 14 is also maintained concentric with the machined bore 20. This alignment ensures that the cutting tool 14 continue to bore the cored passage 18 in a straight line.

The hardened guide members 34 can adjust inwardly or outwardly as needed to compensate for the change in the effective diameter of the cutting tool 14 while still maintaining the cutting tool 14 concentric with the machined bore 20. The changes to the outer diameter of the cutting tool 14 can be attributed to wear from use, re-sharpening or by the cutting tool being replaced with another cutting tool having a slightly different diameter.

Since the hardened guide members 34 have sufficient longitudinal length, at least a portion of their longitudinal length is always in contact with the machined bore 20 to ensure that the cutting tool 14 is machining a straight hole.

In view of the foregoing, it is readily apparent that the present invention provides a boring tool assembly 10 that ensure a bored hole is machined straight even if the hole to be bored is interrupted with cavities and/or has interrupted surfaces. Additionally, the subject invention eliminates the need to have special, separate elements to aid in machining a straight hole.

Other aspects, objects and advantages of this invention can be obtained from a study of the drawings, the disclosure and the appended claims.

We claim:

1. A boring tool assembly adapted to have a cutting tool disposed on one end thereof to cut a hole of a predetermined size in a member, the boring tool assembly comprising:

a longitudinal extending boring bar having a plurality of slots defined therein about its circumference along its longitudinal length, each of the slots has a bottom surface and opposed side walls;

a hardened guide member disposed in each of the respective slots of the plurality of slots; and a resilient member disposed in each of the respective slots between the hardened guide member and the bottom of the associated slot, each of the respective resilient member being connected to the bottom surface of the associated slot and to the associated hardened guide member.

2. The boring tool assembly of claim 1 wherein each of the hardened guide members is disposed on the boring bar generally adjacent the cutting tool.

3. The boring tool assembly of claim 2 wherein the length of each of the guide members is greater than the diameter of the boring bar.

4. The boring tool assembly of claim 3 wherein the respective resilient members are each bonded to the bottom surface of the associated slot and to the associated guide member.

5. The boring tool assembly of claim 4 including a passage defined within the boring bar along its longitudinal length.

* * * * *